Patented June 4, 1935

2,003,865

UNITED STATES PATENT OFFICE 2,003,865

COMPOSITION FOR USE IN SOLDERING CHAIN LINKS

John E. Pilling, Providence, R. I.

No Drawing. Application July 29, 1932,
Serial No. 626,222

2 Claims. (Cl. 148—24)

This invention relates to a composition for use in soldering chain links.

It has long been customary to make chains from solder filled wire, but the cost of producing such wire is high and it is desirable from the viewpoint of expense to employ solid wire. If this is done, however, solder must be introduced in some manner to the minute gap between the link ends for the purpose of soldering these ends together. Various methods and materials have been proposed for this purpose, for example, it has been suggested that a film of soldering material might be applied to the entire surface of the links—including of course their adjacent ends—by electrolytic action, and a more recent method and means advanced is to initially spread or smear over the link surface a pasty composition comprising a metal solder powder, red phosphorus and oil and then apply a dry powder to absorb the moisture of the paste and render it dry enough to fall off from the links except such as will remain in the gaps. This method and composition have not proved entirely satisfactory and yet have been deemed preferable to the electrolytic method or the old solder filled wire method.

The present invention is directed to the provision of a novel composition of matter which can be made up from easily obtained and inexpensive materials in powdered form and applied initially in its dry state to a solid wire chain.

The preferred composition comprises copper, tin and ordinary borax. The proportional parts of each may be varied to an appreciable degree without affecting the soldering ability of the composition. I have found, however, that a mixture having one part of tin, two parts of copper and three parts of borax is suitable. The tin content may vary, however, from ten to twenty per cent of the whole, and the copper from forty to thirty per cent of the whole and the borax accordingly. Both metals are used in a finely powdered state and when mixed with the borax provide a dry powdered composition.

I may also use in place of the ordinary borax a mixture of borax, boracic acid (in the powdered state) and sodium chloride (fine salt). These ingredients I mix in equal parts, that is one-third of each by volume. This mixture is in turn mixed with the tin and copper and in the same proportion as the ordinary borax alone so that the final composition is one-sixth part each of borax, boracic acid, sodium chloride and tin and two-sixths of copper.

In applying the composition to the links, the chain as it comes from the chain making machine is wound or looped in skeins or hanks in such lengths as can be conveniently handled. Each hank is then placed in the dry powder which for convenience may be contained in a dish. The dry powder is rubbed onto the chain by the hands and thereby forced into the gaps between the links. Any oil which is present on the chain is readily absorbed by the powder so that after a very short period of rubbing the link surfaces are dry and clean, the powder falling off except that which is impacted or retained in the link gaps. The chain may now be submitted to heat treatment to effect the soldering of the link ends together.

If desired, the chain may prior to heating be rubbed with powdered graphite which has been very slightly moistened with water to cause it to adhere to the link surface, and if extreme caution is exercised the chain may be also dusted with powdered magnesium or powdered talc. The application of the graphite, magnesium and talc are not deemed necessary because the rubbing of the chain with the dry powder composition of the invention suitably cleans the link surfaces and prevents any so-called stiff-soldering during the application of the heat.

If the chain is heavily coated with oil as it leaves the chain making machine, this oil may be largely removed by wiping the chain prior to its being rubbed with the composition but it is not necessary to clean the chain in the sense in which that operation has heretofore been deemed necessary. The application of the dry composition sufficiently cleans the chain and all that need be watched is the dry condition of this composition. Where considerable chain is being handled it is desirable to have one or more dishes so that if the composition in one tends to become damp by reason of oil absorption it can be dried out while another dish of composition is being used.

I claim:

1. A composition of matter for use in the preparation of chains for soldering consisting of one part of powdered tin, two parts of powdered copper and three parts of borax.

2. A composition of matter for use in the preparation of chains for soldering consisting of from ten to twenty per cent of tin, from forty to thirty per cent of copper and the remainder borax; all the said ingredients being mixed in powdered form.

JOHN E. PILLING.